US007161634B2

(12) United States Patent
Long

(10) Patent No.: US 7,161,634 B2
(45) Date of Patent: Jan. 9, 2007

(54) ENCODING SYSTEM FOR ERROR DIFFUSION DITHERING

(75) Inventor: Wai Khaun Long, San Jose, CA (US)

(73) Assignee: Huaya Microelectronics, Ltd., San Jose, CA (US)

( * ) Notice: Subject to any disclaimer, the term of this patent is extended or adjusted under 35 U.S.C. 154(b) by 560 days.

(21) Appl. No.: 10/384,134

(22) Filed: Mar. 6, 2003

(65) Prior Publication Data

US 2004/0174463 A1 Sep. 9, 2004

(51) Int. Cl.

| | |
|---|---|
| ***H04N 5/213*** | (2006.01) |
| ***H04N 5/217*** | (2006.01) |
| ***G09G 5/00*** | (2006.01) |
| ***G06K 9/36*** | (2006.01) |

(52) U.S. Cl. ...................... 348/624; 348/574; 345/616; 345/597; 382/252

(58) Field of Classification Search ................ 348/624, 348/618, 574; 345/616, 611, 89; 358/3.01–3.08; 382/252

See application file for complete search history.

(56) References Cited

U.S. PATENT DOCUMENTS

| | | | | |
|---|---|---|---|---|
| 4,955,065 | A * | 9/1990 | Ulichney | 382/270 |
| 5,055,942 | A * | 10/1991 | Levien | 358/3.03 |
| 5,570,461 | A * | 10/1996 | Yokomizo | 345/616 |
| 5,596,349 | A * | 1/1997 | Kobayashi et al. | 345/690 |
| 5,787,206 | A * | 7/1998 | Williams et al. | 382/237 |
| 6,771,832 | B1 * | 8/2004 | Naito et al. | 382/252 |

* cited by examiner

*Primary Examiner*—Michael H. Lee
(74) *Attorney, Agent, or Firm*—Silicon Valley Patent Group; Edward S. Mao

(57) ABSTRACT

An error diffusion system in accordance with an embodiment of the present invention adjusts the color depth of an RGB signal using error diffusion without the using an expensive frame buffer. Specifically, a color depth adjustment unit in accordance with the present invention can perform error diffusion on an RGB signal using two error buffers, which are smaller in memory size than typical line buffers that would be used for the video stream.

15 Claims, 9 Drawing Sheets

ENCODING SYSTEM FOR ERROR DIFFUSION DITHERING

BACKGROUND OF THE INVENTION

1. Field of the Invention

The present invention relates to digital graphics systems. More specifically, the present invention relates to methods and circuits for applying error diffusion dithering.

2. Discussion of Related Art

Analog video displays such as cathode ray tubes (CRTs) dominate the video display market. Thus, most electronic devices that require video displays, such as computers and digital video disk players, output analog video signals. As is well known in the art, an analog video display sequentially reproduces a large number of still images to give the illusion of full motion video. Each still image is known as a frame. For NTSC television, which is interlaced, 30 whole frames (i.e. 30 even fields and 30 odd fields) are displayed in one second. For computer applications, the number of frames per seconds is variable with typical values ranging from 56 to 100 frames per seconds.

FIG. 1(*a*) illustrates a typical analog video display 100. Analog video display 100 comprises a raster scan unit 110 and a screen 120. Raster scan unit 110 generates an electron beam 111 in accordance with an analog video signal VS, and directs electron beam 111 against screen 120 in the form of sequentially-produced horizontal scanlines 101–109, which collectively form one frame. Screen 120 is provided with a phosphorescent material that is illuminated in accordance with the video signal VS transmitted in electron beam 111 to produce contrasting bright and dark regions that create an image, such as the diamond shape shown in FIG. 1(*c*). After drawing each scanline 101–108, raster scan unit 110 performs a horizontal flyback 130 to the left side of screen 120 before beginning a subsequent scanline. Similarly, after drawing the last scanline 109 of each frame, raster scan unit 110 performs a vertical flyback 131 to the top left corner of screen 120 before beginning a subsequent frame. To avoid generating an unwanted flyback traces (lines) on screen 120 during horizontal flyback 130, video signal VS includes a horizontal blanking pulse that turn off electron beam 111 during horizontal flyback 130. Similarly, during vertical flyback 131, video signal VS includes a vertical blanking pulse that turns off electron beam 111 during vertical flyback 131.

Digital video display units, such as liquid crystal displays (LCDs), are becoming competitive with analog video displays. Typically, digital video display units are much thinner and lighter than comparable analog video displays. Thus, for many video display functions, digital video displays are preferable to analog video displays. For example, a 19 inch (measured diagonally) analog video display, which has a 17 inch viewable area, may have a thickness of 19 inches and weigh 80 pounds. However, a 17 inch digital video display, which is equivalent to a 19 inch analog video display, may be only 4 inches thick and weigh less than 15 lbs. However, most computer systems are designed for use with analog video displays. Thus, the analog video signal provided by a computer must be converted into a format compatible with digital display systems.

FIG. 1(*b*) illustrates a typical analog video signal VS for analog video display 100. Video signal VS is accompanied by a horizontal synchronization signal HSYNCH and a vertical synchronization signal VSYNCH (not shown). Vertical synchronization signal VSYNCH contains vertical synch marks to indicate the beginning of each new frame. Typically, vertical synchronization signal VSYNCH is held at logic high and each vertical synch mark is a logic low pulse. Horizontal synchronization signal HSYNCH contains horizontal synch marks (logic low pulses) 133, 134, and 135 to indicate the beginning of data for a new scanline. Specifically, horizontal synch mark 133 indicates video signal VS contains data for scanline 103; horizontal synch mark 134 indicates video signal VS now contains data for scanline 104; and horizontal synch mark 135 indicates video signal VS now contains data for scanline 105.

Video signal VS comprises data portions 112, 113, 114, and 115 that correspond to scanlines 102, 103, 104, and 105, respectively. Video signal VS also comprises horizontal blanking pulses 123, 124 and 125, each of which is located between two data portions. As explained above, horizontal blanking pulses 123, 124, and 125 prevent the electron beam from drawing unwanted flyback traces on analog video display 100. Each horizontal blanking pulse comprises a front porch FP, which precedes a horizontal synch mark, and a back porch BP which follows the horizontal synch mark. Thus, the actual video data for each row in video signal VS lies between the back porch of a first horizontal blanking pulse and the front porch of the next horizontal blanking pulse.

FIG. 1(*c*) illustrates a typical digital display 150. Digital display 150 comprises a grid of picture elements ("pixels") divided into rows 151–159 and columns 161–174. Each data portion (e.g. data portions 112, 113, 114, and 115) is treated as one row of a digital display. Each data portion is also divided into smaller portions and digitized to form pixel data that is transmitted to its designated pixel using row driver 180 and column driver 190. Typically, digital pixel data is given in RGB format, i.e., red-green-blue, which provides the amount of red, green, and blue intensity for the pixel. In video applications, YUV format is often used for both digital and analog video streams. Expensive digital displays can have 256 shades of red, 256 shades of green and 256 shades of blue in each pixel. Thus, each color is represented by 8 bits of data and each pixel can have display 16,777,216 colors. However, some lower cost digital displays cannot display that many colors. For example, many digital displays only use 6 bits of data for red, green, and blue.

To create a digital display from an analog video signal, the analog video signal must be digitized at precise locations to form the pixels of a digital display. Furthermore, the YUV format of the analog video stream is typically converted into RGB format for the digital display. Conversion of analog video signals to digital video signals are well known in the art and thus not described herein.

Generally, the digital data stream is processed using as much color depth as possible. Such processing may include noise reduction, edge enhancement, scaling (interpolation or decimation), sharpness enhancement, color management, gamma correction, etc. Then depending on the color depth of the digital display, the digital data stream is reduced to the color depth of the display system. As illustrated in FIG. 2, a conventional color depth adjustment unit 220 converts an RGB input signal RGB_I(8,8,8) into an RGB output signal RGB_O(6,6,6), which uses only 6 bits of data for red, green, and blue, for digital display unit 230. Color depth adjustment unit 220 includes a frame buffer 225 and an error diffusion unit 227. Frame buffer 225 is used to store the images of RGB input signal RGB_I(8,8,8) so that error diffusion unit 227 can apply an error diffusion mask to the images. Error diffusion is a well known in art for use in color depth adjustment. For high resolution images, frame buffer 225 is quite large and expensive. Hence there is a need for a system and method to perform color depth adjustment without requiring large frame buffers.

SUMMARY

The present invention adjusts the color depth of an RGB signal using error diffusion without the using an expensive frame buffer. Specifically, a color depth adjustment unit in accordance with the present invention can perform error diffusion on an RGB signal using two error buffers, which are smaller in memory size than typical line buffers that would be used for the video stream.

In one embodiment of the present invention, the color depth adjustment unit converts an input video signal, which include input pixels with input color portions of an input color size, into an output video signal, which include output pixels with output color portions of an output color size. The color depth adjustment unit includes an error diffusion unit a first error buffer and a second error buffer. The error diffusion unit is coupled to receive the input video signal and generates the output video signal. The first error buffer and the second error buffer include error memory units having color portions of an error buffer size. The error buffer size is less than the input color size. Other embodiments of the present invention include a next pixel error register and an error shift register.

Embodiments of the present invention can use error buffers having an error buffer size smaller than the input color size by using codewords for each possible error value generated by the error diffusion process.

The present invention will be more fully understood in view of the following description and drawings.

BRIEF DESCRIPTION OF THE DRAWINGS

FIG. 1(*b*) is a simplified illustration of an analog video stream.

FIG. 1(*c*) is a simplified illustration of a digital video display.

FIG. 3(*b*) illustrates the data for a pixel of an RGB signal using 6 bits of data for red, green, and blue.

DETAILED DESCRIPTION

Figure 3A:
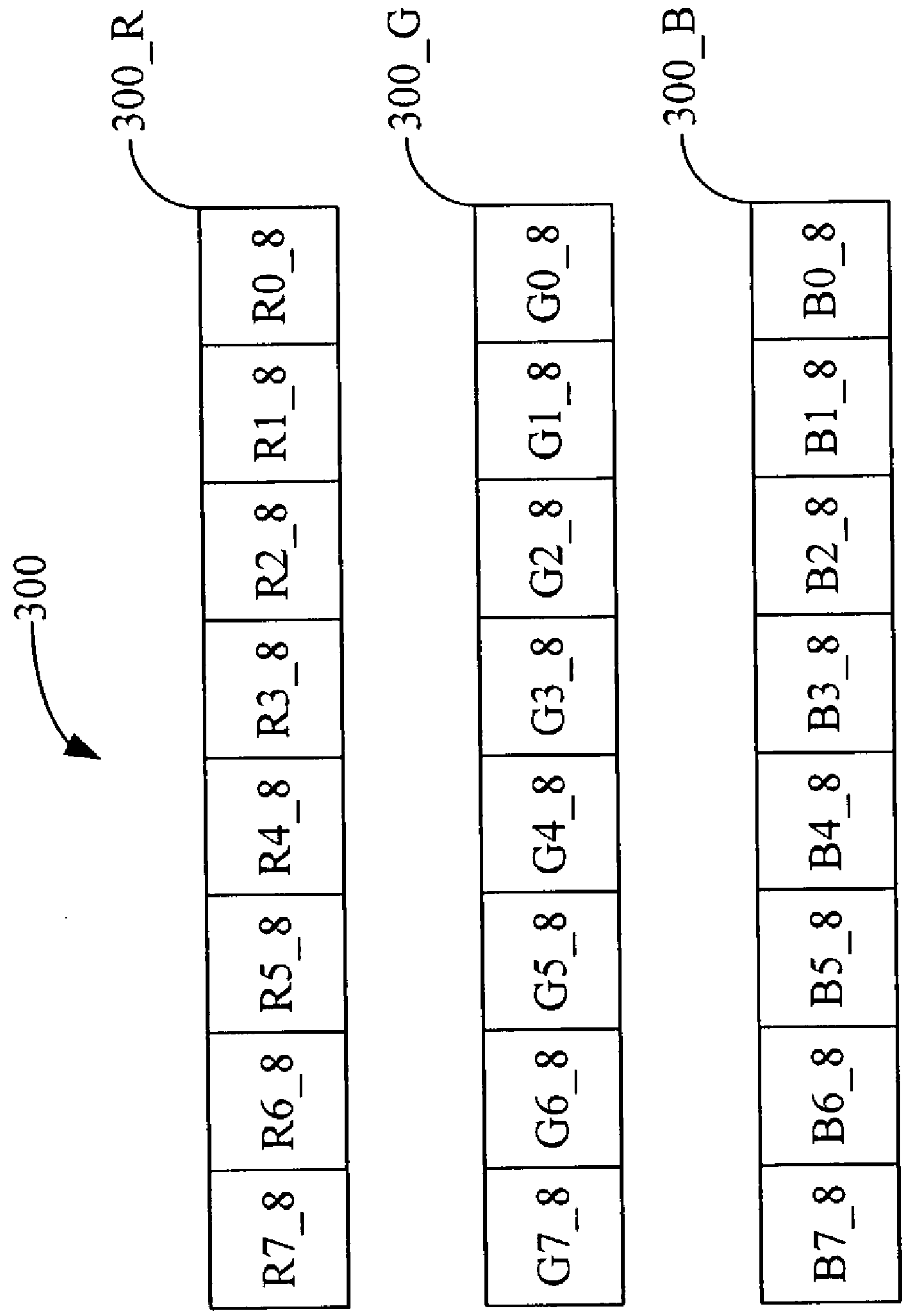
FIG. 3(*a*) illustrates the data for a pixel of an RGB signal using 8 bits of data for red, green, and blue.
Figure 3B:
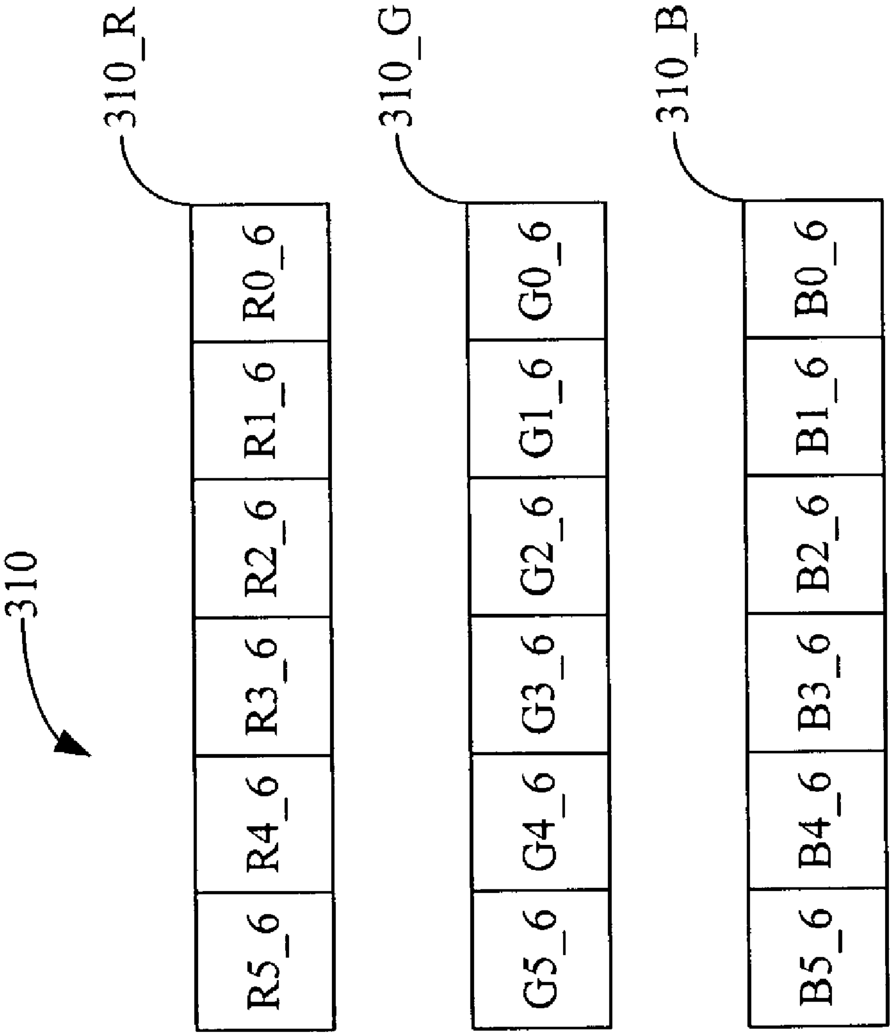

FIG. 3(*a*) illustrates the data for a pixel 300 of RGB input signal RGB_I(8,8,8). Specifically, pixel 300 includes a red data portion 300_R, a green data portion 300_G, and a blue data portion 300_B. Each data portion includes 8 bits of data. Specifically, red data portion 300_R includes data bits R7_8–R0_8, with bit R7_8 being the most significant bit and bit R0_8 being the least significant bit of red data portion 300_R. Similarly, green data portion 300_G includes 8 data bits G7_8–G0_8 and blue data portion 300_B includes 8 data bits B7_8–B0_8. For clarity, bits in a pixel are referenced as a color letter (R, G, or B) followed by a bit number, then an underscore, followed by the number of color bits in each color. Thus, bit RX_Y refers to the Xth bit of the red portion of a pixel using Y number of bits.

FIG. 3(*b*) illustrates the data for a pixel 310 of RGB output signal RGB_O(6,6,6). Specifically, pixel 310 includes a red data portion 310_R, a green data portion 310_G, and a blue data portion 310_B. Each data portion includes 6 bits of data. Specifically, red data portion 310_R includes data bits R5_6–R0_6, with bit R5_6 being the most significant bit and bit R0_6 being the least significant bit of red data portion 310_R. Similarly, green data portion 310_G includes 6 data bits G5_6–GO_6 and blue data portion 310_B includes 8 data bits B5_6–B0_6.

Figure 1A:
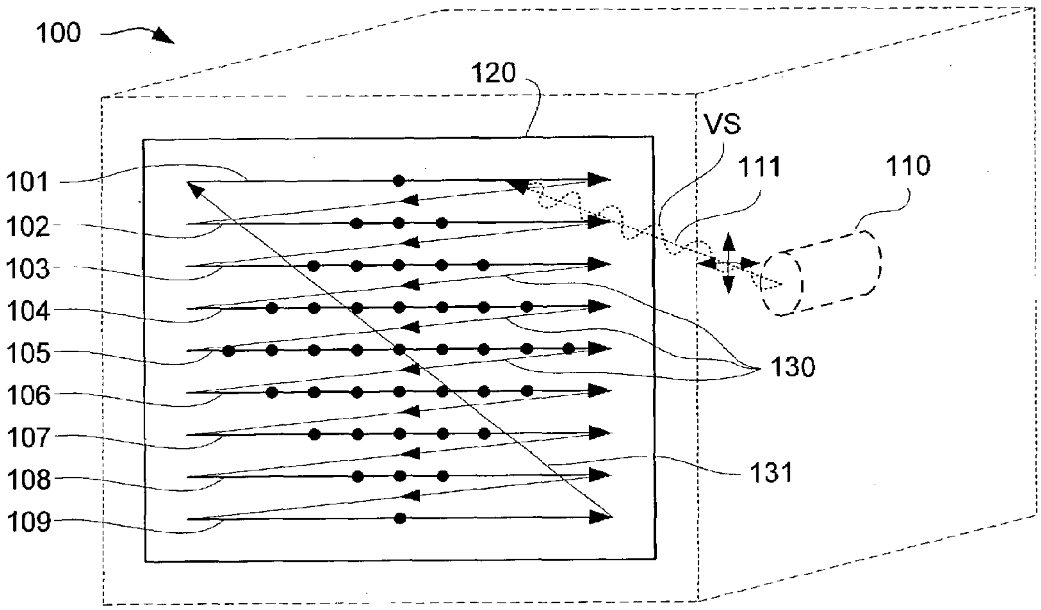
FIG. 1(*a*) is a simplified illustration of an analog video display.
Figure 1B:
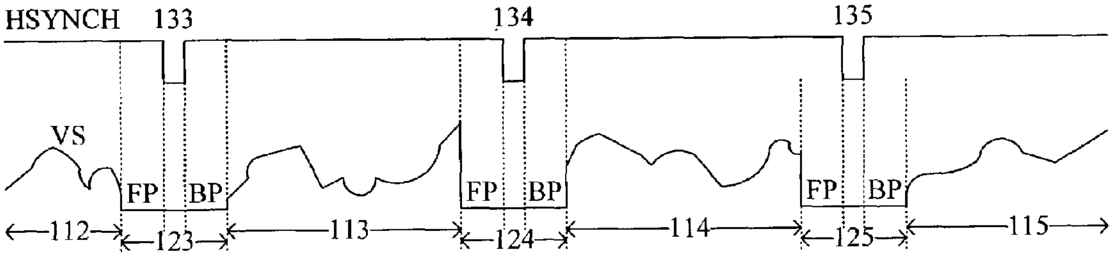
Figure 1C:
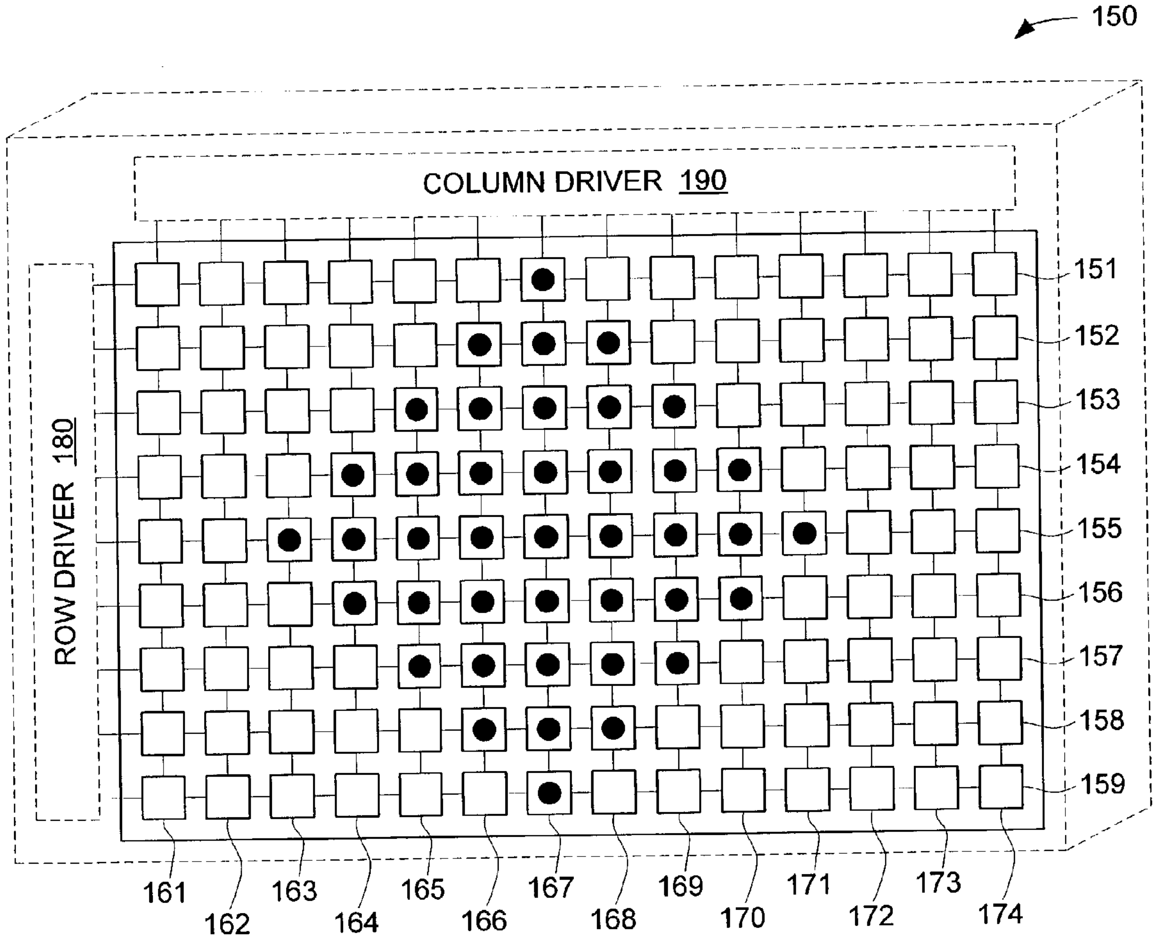
Figure 2:
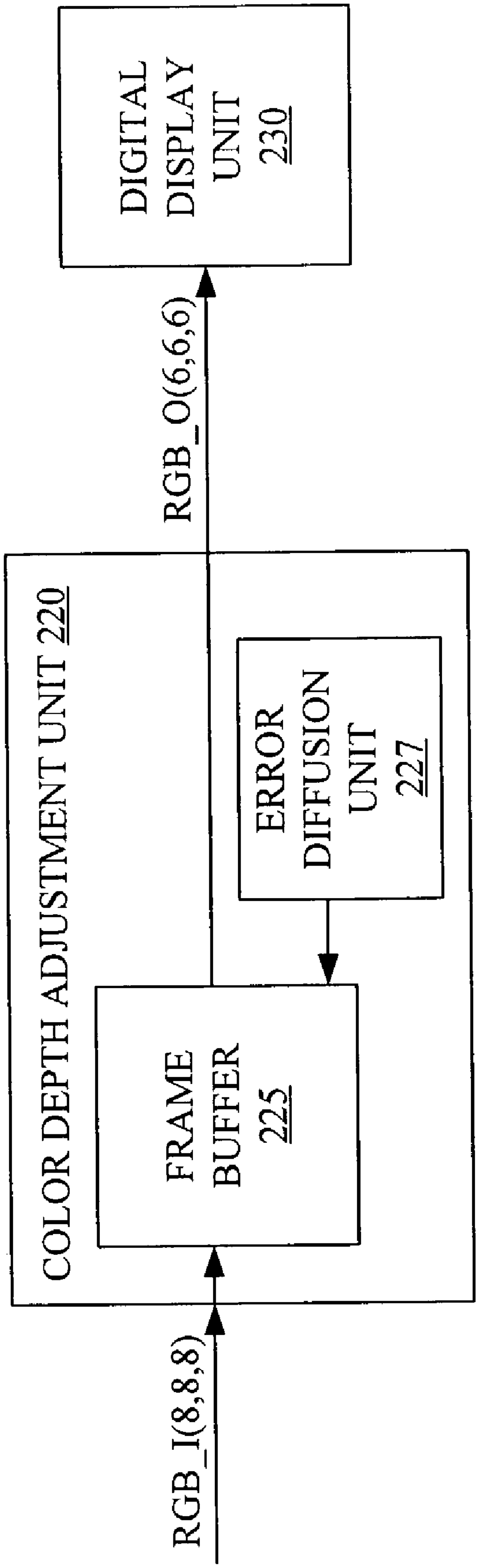
FIG. 2 is block diagram of a system using a conventional color depth adjustment unit having a frame buffer.

The simplest way to perform color depth adjustment is to ignore some of the least significant bits for each color. For example to convert an 8 bit per color RGB signal (such as RGB input signal RGB_I(8,8,8) in FIG. 2) to a 6 bit per color RGB signal (such as RGB output signal RGB_O(6,6,6)), the two least significant bits of red data portion 300_R, green data portion 300_G, and blue data portion 300_B are ignored. Then, the remaining 6 bits of each color portion of pixel 300 (FIG. 3(*a*)) are copied into the corresponding color portions of pixel 310 (FIG. 3(*b*)). Specifically, bit R(X)_8 of red portion 300_R is read as bit R(X−2)_6 of red portion 310_R, where X is an integer from 7 to 2, inclusive. For example, bit R4_6 of red portion 310_R is equal to bit R6_8 of bit portion 300_R. Similarly, bit G(X)_8 of green portion 300_G is read as bit G(X−2)_6 of green portion 310_G, where X is an integer from 7 to 2, inclusive. Furthermore, bit B(X)_8 of blue portion 300_B is read as bit R(X−2)_6 of blue portion 310_B, where X is an integer from 7 to 2, inclusive.

Figure 4:
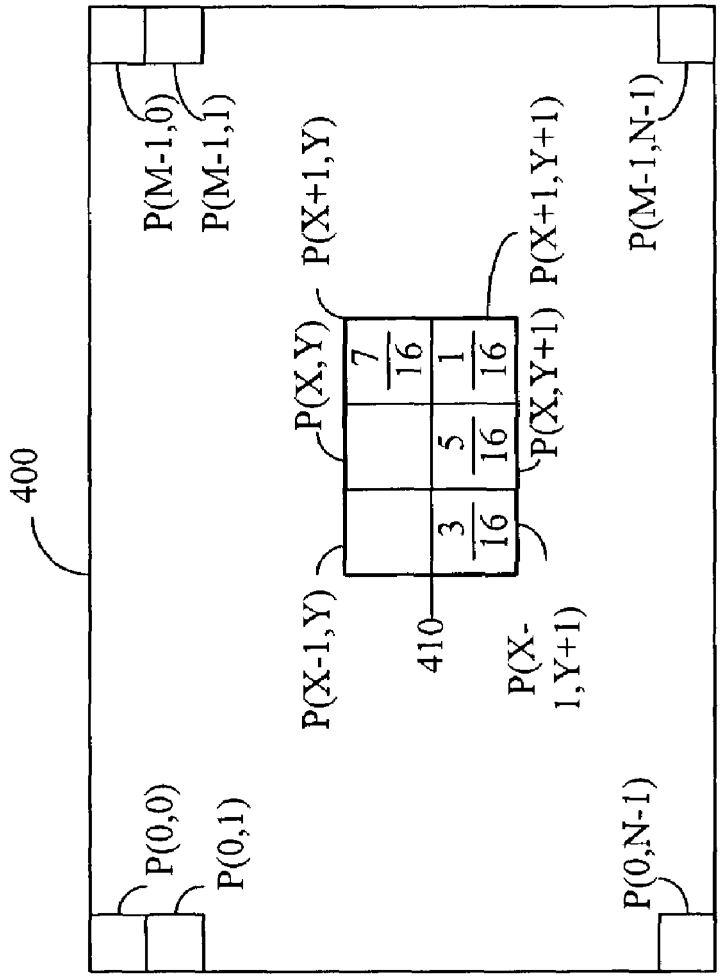
FIG. 4 is a filter mask used for error diffusion.

However, higher quality pictures can be achieved using error diffusion dithering to spread the color information from the least significant bits of a pixel to nearby pixels. For conciseness, error diffusion dithering, which is well known in the art is only described briefly herein. FIG. 4 illustrates a filter mask 410 used to apply error diffusion dithering to an image 400 having MxN pixels. For clarity, a specific filter mask is described herein, however the principles of the present invention can be used with a variety of filter masks. In addition, the examples contained herein reduce color depth from 8 bits to 6 bits, however the principles of the present invention can be used for color depth reduction of any number of bits.

To perform error diffusion dithering, filter mask 410 is applied to each pixel of image 400. In general pixel mask 410 is applied to each pixel from left to right along each horizontal line of image 400. Each horizontal line is processed from top to bottom. Thus, filter mask 410 is first applied to pixel P(0,0) in the top left corner of image 400 and proceeds to pixel P(M−1,0) in the top right corner of image 400. Then filter mask is applied to pixel P(0,1) and proceeds to pixel P(M−1,1). This left to right, top to bottom approach continues until filter mask 410 is applied to pixel P(M−1, N−1) in the bottom right corner of Image 400.

Applying filter mask 410 to a pixel P(X,Y) involves spreading the data from the 2 least significant bits of each color to one or more pixels near pixel P(X,Y). Error diffusion dithering is applied for each color of the pixel independently. For conciseness, error diffusion dithering is described herein for the red data portions. Processing of the green data portion and blue data portion is the same. As stated above, the example described herein converts color depth from 8 bits to 6 bits. Thus, each data portion of a pixel in image 400 includes 8 bits. After filter mask 410 is applied to a pixel P(X,Y) only the 6 most significant bits of each color portion of pixel P(X,Y) should contain data so that image 400 can be easily converted to a color depth of 6 bits.

The first step of applying filter mask 410 to pixel P(X,Y) is to determine a 6 bit red output value ROV(X,Y) for pixel P(X,Y) and a red output error ROE(X,Y). Red output value ROV(X,Y) is determined by taking the 6 most significant bits of a value obtained by rounding the 8 bit data from the red portion of pixel P(X,Y) to a 8 bit value with 00 as the two least significant bits. Red output error ROE(X,Y) is equal to the difference between the rounded value and the original red value in pixel P(X,Y). These calculations can be simplified by treating the original 8 bit values of the red portion of pixel P(X,Y) as a 6 bit number (called red input value RIV(X,Y) followed by a 2 bit number (called red input error RIE(X,Y)). Table 1 provides the appropriate red output value ROV(X,Y) and red output error ROE(X,Y) depending on the value of red input error RIE(X,Y)

TABLE 1

| RIE(X, Y) | ROE(X, Y) | ROV(X, Y) |
|---|---|---|
| 0, 0 | 0 | RIV(X, Y) |
| 0, 1 | 1 | RIV(X, Y) |
| 1, 0 | −2 | RIV(X, Y) + 1 |
| 1, 1 | −1 | RIV(X, Y) + 1 |

However, if red input value RIV(X,Y) is equal to 111111, red output value ROV(X,Y) is set to be equal to 111111 regardless of the value of red input error RIE(X,Y).

The red data portion of pixel P(X,Y) is set equal to red output value ROV(X,Y). Then red output error ROE(X,Y) is distributed to nearby pixels. As illustrated in FIG. 4, pixel P(X+1,Y) receives $7/16$ of red output error ROE(X,Y), pixel P(X−1, Y+1) receives $3/16$ of red output error ROE(X,Y), pixel P(X, Y+1) receives $5/16$ of red output error ROE(X,Y), and pixel P(X+1, Y+1) receives $1/16$ of red output error ROE(X,Y). Different embodiments of the present invention may use different values in filter mask 410. Error diffusion for the green and blue portion of image 400 is performed similarly.

Figure 5:
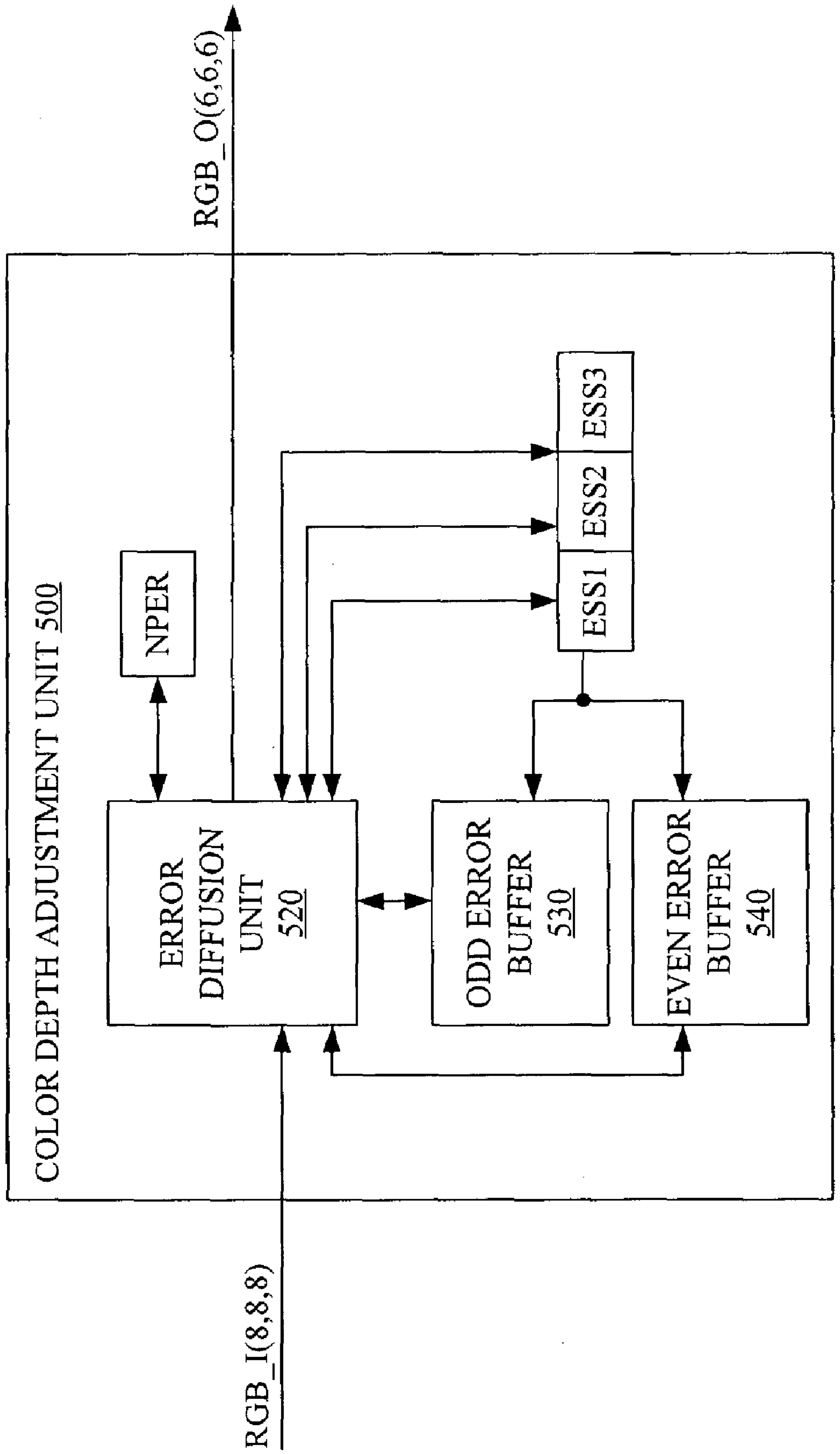
FIG. 5 is a block diagram of a color depth adjustment unit in accordance with one embodiment of the present invention.

As explained above, conventional color depth reduction units use a frame buffer to perform error diffusion, which greatly increases the cost of the color depth reduction unit. FIG. 5 illustrates a color depth adjustment unit 500 in accordance with one embodiment of the present invention. Instead of a full frame buffer, color depth adjustment unit 500 can perform error diffusion dithering using an odd error buffer 530, an even error buffer 540 and a few registers, such as a next pixel error register NPER, and an error shift register ESR formed of three error shift stages ESS1, ESS2, and ESS3. Color depth adjustment unit 500 also includes an error diffusion unit 520 which performs error diffusion dithering on the in RGB input signal RGB_I(8,8,8). Error diffusion unit 520 also provides RGB output signal RGB_0 (6,6,6).

In the embodiment of FIG. 5, odd error buffer 530 and even error buffer 540 are single port error buffers that are used in conjunction for reading and writing error values simultaneously. Error diffusion unit 520 uses error values from even error buffer 540, which contains error values from a previous odd line of pixels, to process even line of pixels from RGB input signal RGB_I(8,8,8). Error values generated by error diffusion unit 520 when processing an even line of pixels in RGB input signal RGB_I(8,8,8) are stored in odd error buffer 530. These error values are for the next odd line of pixels. Conversely, error diffusion unit 520 uses error values from odd error buffer 530, which contains error values from a previous even line of pixels, to process odd lines of pixels from RGB input signal RGB_I(8,8,8). Error values generated by error diffusion unit 520 when processing an odd line of pixels in RGB input signal RGB_I(8,8,8) are stored in even error buffer 540. These error values are for the next even line of pixels. In the embodiment of FIG. 5, two single ported error buffers are less costly than a single dual ported error buffer. However, other embodiments of the present invention may use a single dual ported error buffer.

Furthermore, other embodiments of the present invention may use additional registers or may eliminate some of the registers shown in FIG. 5. RGB input signal RGB_I(8,8,8) contains a series of images having N lines of M pixels, with each pixel having 8 bits of red data, 8 bits of green data, and 8 bits of blue data. Odd error buffer 530 and even error buffer 540 includes M error memory units. Each error memory unit is divided into a red portion, a green portion and a blue portion. By using the techniques of the present invention described below, the data portions of error buffer 530 and error buffer 540 are generally smaller than the data portions of pixels in RGB input signal RGB_I(8,8,8). Next pixel error register NPER and error shift stages ESS1, ESS2, and ESS3 includes a green portion, a red portion, and a blue portion. The images in RGB output signal RGB_O also have N lines of M pixels; however, each pixel of RGB output signal RGB_O includes fewer bits of color data than RGB input signal RGB_I(8,8,8). For the embodiment of FIG. 5, RGB output signal RGB_O(6,6,6) includes 6 bits of red data, 6 bits of green data, and 6 bits of blue data.

Error memory units of odd error buffer 530 are referenced as O_EMU(X), where X is an integer from 0 to M−1. Similarly, error memory units of even error buffer 540 are referenced as E_EMU(X), where X is an integer from 0 to M−1. When referencing error memory units, they can be from either odd error buffer 530 or even error buffer 540, hence EMU(X) is used. The Specific color portions of an error memory unit O_EMU(X) are referenced as O_EMU_R(X), O_EMU_G(X), and O_EMU_B(X), for the red, green, and blue portions, respectively. Similarly, specific color portions of an error memory unit E_EMU(X) are referenced as E_EMU_R(X), E_EMU_G(X), and E_EMU_B(X), for the red, green, and blue portions, respectively. Likewise, the red, green, and blue portions of next pixel error register NPER are referenced as NPER_R, NPER_G, and NPER_B, respectively. The color portions of error shift stages ESS1, ESS2, and ESS3 are similarly referenced by appending R, G, or B.

As illustrated in Table 1, the minimum red output value (ROE) is equal to −2 and the maximum red output value (ROE) is 1. For an error memory unit EMU(X), the minimum value for EMU_R(X), i.e. the red portion of an error memory unit EMU(X), occurs for pixels P(X−1), P(X), and P(X+1) of the previous line have a red output value of −2. In this case, EMU_R(X) would equal $-18/16$, i.e. $1/16*(-2)+5/16*(-2)+3/16*(-2)$. Conversely, the maximum value of EMU_R(X), i.e. the red portion of an error memory unit EMU(X), occurs pixels P(X−1), P(X), and P(X+1) of the previous line have a red output value of 1. In this case, EMU_R(X) would equal $9/16$, i.e. $1/16*(1)+5/16*(1)+3/16*(1)$. Thus the range of EMU_R(X) is $-18/16$ to $9/16$. To simplify the calculations required by error diffusion unit $-18/16$ to $9/16$, only the numerator of the fractions are used when possible. Furthermore, these numerators are coded using the numbers 1 to 28 as illustrated in table 2. Specifically, 19 is added to the numerators. Table 2 also includes the binary equivalent of the numbers 1 to 28.

TABLE 2

| ERROR VALUE | CODEWORD | BINARY |
|---|---|---|
| −18 | 1 | 00001 |
| −17 | 2 | 00010 |
| −16 | 3 | 00011 |
| −15 | 4 | 00100 |
| −14 | 5 | 00101 |
| −13 | 6 | 00110 |
| −12 | 7 | 00111 |
| −11 | 8 | 01000 |
| −10 | 9 | 01001 |
| −9 | 10 | 01010 |
| −8 | 11 | 01011 |
| −7 | 12 | 01100 |
| −6 | 13 | 01101 |
| −5 | 14 | 01110 |
| −4 | 15 | 01111 |
| −3 | 16 | 10000 |
| −2 | 17 | 10001 |
| −1 | 18 | 10010 |
| 0 | 19 | 10011 |
| 1 | 20 | 10100 |
| 2 | 21 | 10101 |
| 3 | 22 | 10110 |
| 4 | 23 | 10111 |
| 5 | 24 | 11000 |
| 6 | 25 | 11001 |
| 7 | 26 | 11010 |
| 8 | 27 | 11011 |
| 9 | 28 | 11100 |

Figure 6:
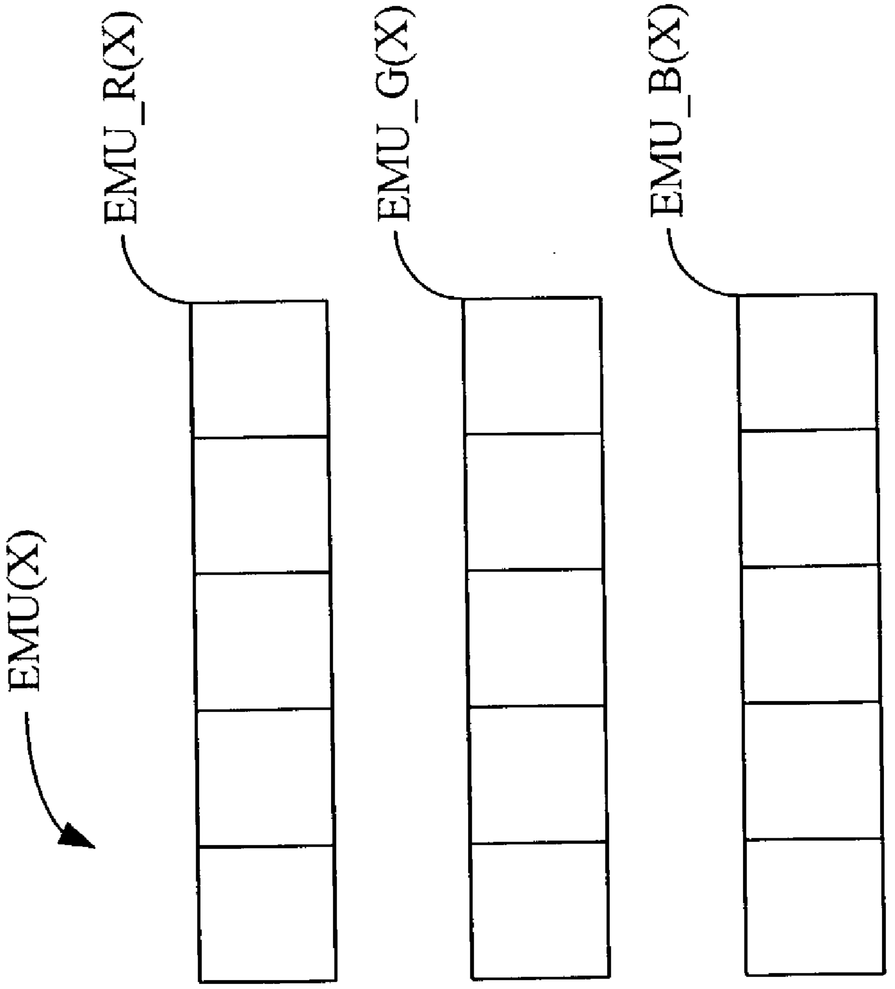
FIG. 6 is a block diagram of a pixel memory in an error buffer in accordance with one embodiment of the present invention.

Because the numbers 1 to 28 can be coded using five binary bits, the red color portions for each error memory unit of error buffer 530 can be as small as five bits. The description for the red portion given above is also applicable for green portions and blue portions. Thus, as illustrated in FIG. 6 an error memory unit EMU(X), in accordance with one embodiment of the present invention, has a five bit red portion EMU_R(X), a five-bit green portion EMU_G(X), and a five-bit blue portion EMU_B(X). Thus, by using the principles of the present invention, error memory units of error buffers are smaller than pixel memory units.

Figure 7:
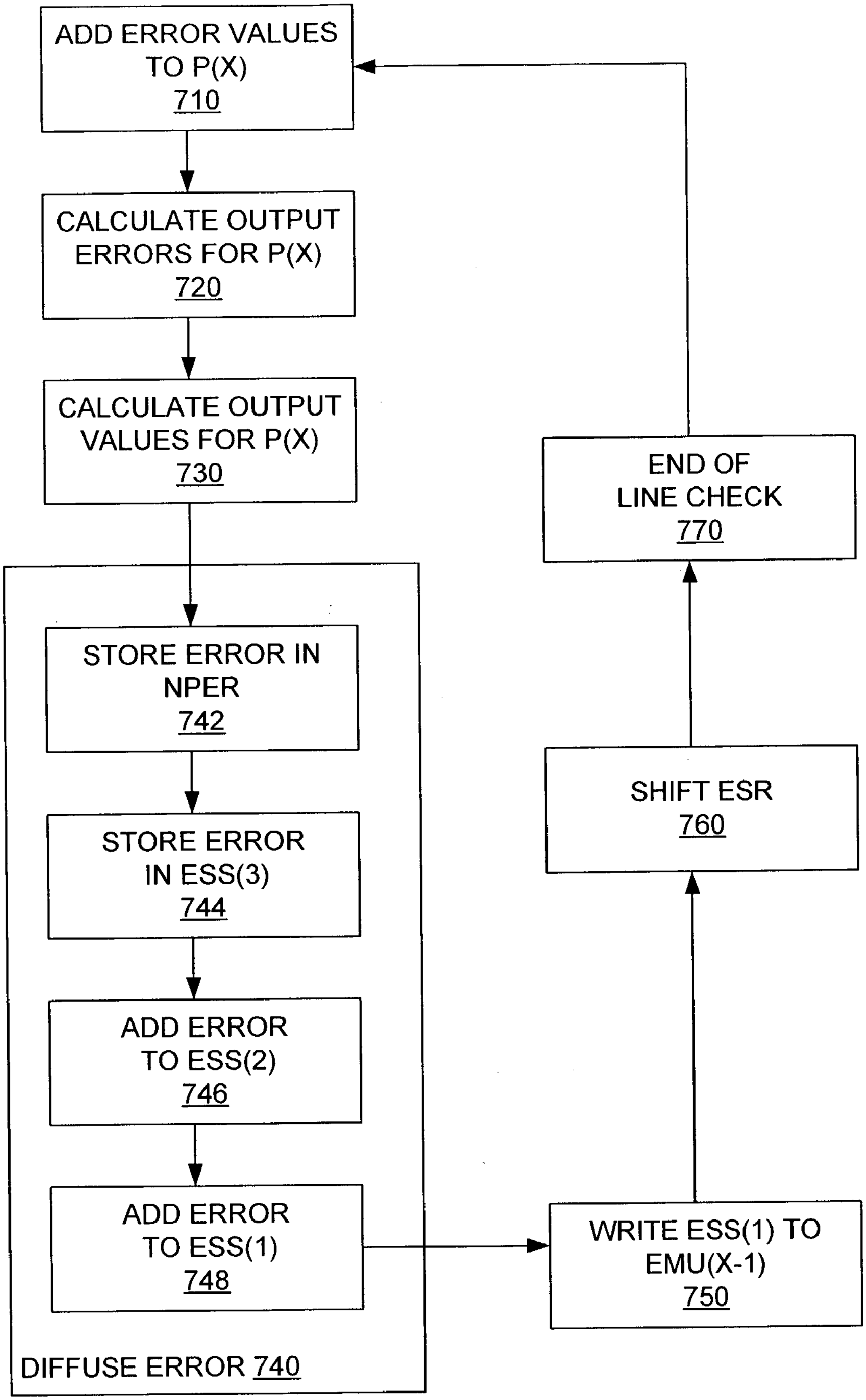
FIG. 7 is a flow diagram for an error diffusion unit in accordance with one embodiment of the present invention.

FIG. 7 is a flow diagram, which illustrates the functions performed by error diffusion unit 520. Image data is processed by error diffusion unit 520 in a pipeline fashion. Specifically, pixel data is provided to error diffusion unit 520 one pixel at a time starting at the beginning of a line i.e. pixel P(0) and proceeding to pixel P(M−1).

In ADD ERROR VALUES TO P(X) step 710 error values from the appropriate error buffers and registers are added to the pixel values of pixel P(X). Specifically, if X is equal to 0, the error value of next pixel error register NPER is set equal to zero, because there are no pixel ahead of P(0), so NPER prior to P(0) should be zero. If pixel P(X) is in the first line of an image, values from next pixel error register NPER are directly applied to the error values (for R, G, and B) of P(X). The resulting values are added to the pixel values of pixel P(X) (for each color). If pixel P(X) is in an even line, the codewords from error memory unit E_EMU(X) of even error buffer 540 are converted to error values using Table 2 (i.e., 19 is subtracted from the codeword to obtain the error value). Then the error values from error memory unit E_EMU(X) and from next pixel error register NPER are added together and divided by 16 (the error values for each color is separately added and divided). The resulting values are added to the pixel values of pixel P(X) (for each color). As used herein, "binary codes from error memory unit E_EMU(X)" and "binary codes from next pixel error register NPER" refers to the contents of the red portion, the green portion, and the blue portion of error memory unit E_EMU(X) and next pixel error register NPER, respectively. Similarly, the pixel values of pixel memory unit P(X) refers to the contents of the red portion, the green portion, and the blue portion of pixel P(X). Mathematical operations are performed for each color (Red, Green, and Blue) separately and independently. If pixel P(X) is in an odd line, the codewords from error memory unit O_EMU(X) of odd error buffer 530 are converted to error values using Table 2 (i.e., 19 is subtracted from the codeword to obtain the error value). Then the error values from error memory unit O_EMU(X) and from next pixel error register NPER are added together and divided by 16 (the error values for each color is separately added and divided). The resulting values are added to the pixel values of pixel P(X) (for each color).

In CALCULATE OUTPUT ERROR FOR P(X) step 720 and CALCLULATE OUTPUT VALUES FOR P(X) step 730, the output errors (for red, green, and blue) and output values (for red, green, and blue) are calculated for pixel P(X) as described above with respect to Table 1. The output values are driven as RGB output signal RGB_O(6,6,6). The error values are diffused in DIFFUSE ERROR step 740.

DIFFUSE ERROR STEP 740 is divided into four steps. First, in STORE ERROR IN NPER step 742, the output errors are multiplied by 7 to derive the error values (for red, green and blue) and stored in next pixel error register NPER.

In STORE ERROR IN ESS(3) step 744, the output errors are multiplied by 1 to derive the error values (for red, green and blue) and stored in error shift stage ESS(3). If X is equal to M−1, i.e. the last pixel of a line, a zero is stored in error shift stage ESS(3).

In ADD ERROR TO ESS(2) step 746, the output errors are multiplied by 5 and added to the error values in error shift stage ESS(2).

Then, in ADD ERROR TO ESS(1) step 748, if X is not 0, the output errors are multiplied by 3 and added to the error values in error shift stage ESS(1). If X is 0 the output errors are not considered, so a zero is stored in error shift stage ESS(1).

In WRITE ESS(1) to EMU(X−1) step 750, the accumulated error is stored in the appropriate error buffer. If pixel P(X) is in an even line, the error values in error shift stage ESS(1) are converted into codewords (using table 2) and are written into error memory unit O_EMU(X−1) of odd error buffer 530. Conversely, if pixel P(X) is in an odd line, the error values in error shift stage ESS(1) are converted into codewords (using table 2) and are written into error memory unit E_EMU(X−1) of even error buffer 540. However, when processing the last line of data, i.e. line is N−1, there is no storing of error values into error memory units, EMU(X).

In shift ESR step 760, the values of error shift register ESR are shifted. Specifically, the error values in error shift stage ESS(2) are copied to error shift stage ESS(1) and the error values in error shift stage ESS(3) are copied to error shift stage ESS(2).

In END OF LINE CHECK step 770, if X is less than M−1, X is incremented by 1. If X is equal to M−1, which indicates that pixel P(X) is the last pixel of a line of an image in RGB input signal RGB_I(8,8,8), the X is set equal to 0, i.e. the beginning of a line of an image. Processing then continues in ADD ERROR VALUES TO P(X) step 710.

The various embodiments of the structures and methods of this invention that are described above are illustrative only of the principles of this invention and are not intended to limit the scope of the invention to the particular embodiments described. For example, in view of this disclosure, those skilled in the art can define other chrominance signals, color change signals, threshold signals, gain factors, thresholds, color enhancement units, color change detection units, threshold detection units, color change sharpening units, and so forth, and use these alternative features to create a method, circuit, or system according to the principles of this invention. Thus, the invention is limited only by the following claims.

I claim:

1. A color depth adjustment unit for converting an input video signal into an output video signal, wherein the input video signal has a plurality of input pixels having a plurality of input color portions of an input color size, and wherein the output video signal has a plurality of output pixels having a plurality of output color portions of an output color size; the color depth adjustment unit comprising:

- an error diffusion unit coupled to receive the input video signal and to generate the output video signal;
- a first error buffer coupled to the error diffusion unit and having a plurality of error memory units having a plurality of color portions of an error buffer size;
- a second error buffer coupled to the error diffusion unit; and
- wherein the error buffer size is less than the input color size.

2. The color depth adjustment unit of claim 1, further comprising a next pixel error register coupled to the error diffusion unit.

3. The color depth adjustment unit of claim 2, further comprising an error shift register coupled to the error diffusion unit, the first error buffer, and the second error buffer.

4. The color depth adjustment unit of claim 3, wherein the error shift register comprises:

- a first error shift stage coupled to the error diffusion unit, the first error buffer and the second error buffer;
- a second error shift stage coupled to the first error shift stage and the error diffusion unit; and
- a third error shift stage coupled to the second error shift stage and the error diffusion unit.

5. The color depth adjustment unit of claim 4, wherein the error diffusion unit is configured to add an error value from the first error buffer to a color value of an input pixel and to determine a first input value and a first input error for the input pixel.

6. The color depth adjustment unit of claim 5, wherein the color value corresponds to a red value.

7. The color depth adjustment unit of claim 5, wherein the color value corresponds to a green value.

8. The color depth adjustment unit of claim 5, wherein the color value corresponds to a blue value.

9. The color depth adjustment unit of claim 5, wherein the error diffusion unit is configured to calculate a first output value and a first output error for the input pixel.

10. The color depth adjustment unit of claim 5, wherein the error diffusion unit is configured to distribute the first output error.

11. The color depth adjustment unit of claim 10, wherein the a first portion of the first output error is distributed to the next pixel error register, a second portion of the first output error is distributed to the third error shift stage, a third portion of the first error is added to the second error shift stage, and a fourth portion of the first error is added to the first error shift stage.

12. The color depth adjustment unit of claim 11, wherein a content value of the first error shift stage is written to a error memory unit of the second error buffer.

13. The color depth adjustment unit of claim 1, wherein the error diffusion unit is configured to add an error value from the first error buffer to a color value of an input pixel and to determine a first input value and a first input error for the input pixel.

14. The color depth adjustment unit of claim 13, wherein the error diffusion unit is configured to calculate a first output value and a first output error for the input pixel.

15. The color depth adjustment unit of claim 14, wherein the error diffusion unit is configured to distribute the first output error.

* * * * *